United States Patent [19]

Nakio

[11] Patent Number: 5,223,564
[45] Date of Patent: Jun. 29, 1993

[54] REINFORCED POLYARYLENE SULFIDE RESIN COMPOSITION AND MOLDED PRODUCT THEREOF

[75] Inventor: Mikio Nakio, Fuji, Japan

[73] Assignee: Polyplastics Co., Ltd., Osaka, Japan

[21] Appl. No.: 843,238

[22] Filed: Feb. 28, 1992

[30] Foreign Application Priority Data

Mar. 5, 1991 [JP] Japan ................................. 3-38511

[51] Int. Cl.$^5$ ................... C08J 5/04; C08K 3/18; C08K 3/22; C08L 65/02
[52] U.S. Cl. ..................... 524/430; 523/214; 524/442; 524/449
[58] Field of Search ............... 523/214; 524/442, 430, 524/449

[56] References Cited

U.S. PATENT DOCUMENTS

| | | | |
|---|---|---|---|
| 4,806,586 | 2/1989 | Nakai | 524/413 |
| 4,885,321 | 12/1989 | Nitoh et al. | 523/219 |
| 5,021,497 | 6/1991 | Ohara et al. | 524/436 |

*Primary Examiner*—Paul R. Michl
*Assistant Examiner*—U. K. Rajguru
*Attorney, Agent, or Firm*—Depaoli & O'Brien

[57] ABSTRACT

A polyarylene sulfide resin composition providing good surface smoothness with excellent surface gloss in a molded product as well as excellent heat resistance, moldability and mechanical properties and which is suitable as the material of construction for automobiles, electric or electronic equipment comprises (A) 100 parts by weight of a polyarylene sulfide resin and (B) 100 to 200 parts by weight of mineral or ceramic fibers having a chemical composition comprising 35 to 50 wt. % of $SiO_2$, 8 to 20 wt. % of $Al_2O_3$, 10 to 40 wt. % of CaO and 3 to 20 wt. % of MgO, represented as oxide.

18 Claims, No Drawings

REINFORCED POLYARYLENE SULFIDE RESIN COMPOSITION AND MOLDED PRODUCT THEREOF

BACKGROUND OF THE INVENTION

The present invention concerns a reinforced polyarylene sulfide resin composition and a molded product thereof. More particularly, the present invention concerns a polyarylene sulfide resin composition which produces a molded product having good surface smoothness and excellent surface luster, as well as having excellent heat resistance, moldability and excellent mechanical properties. Still further, the invention relates to forming materials from a polyarylene sulfide resin composition suitable for use as parts for automobiles, electric or electronic equipments, etc., which are required to have sufficient heat resistance, mechanical properties and surface smoothness, for example, as lamp reflectors.

In recent years, thermoplastic resins having high heat resistance, chemical resistance, as well as flame retardance have been demanded as the materials of construction for electric or electronic equipment parts, for automobile equipment parts and for chemical equipment parts. A polyarylene sulfide resin typically represented by a polyphenylene sulfide (PPS) resin is one of such resins capable of satisfying the above-mentioned requirements and the demand of such resin has therefore increased. However, since polyphenylene sulfide resin is somewhat expensive and fragile when used alone, it has been generally practiced to improve the mechanical properties and the like thereof by blending polyphenylene sulfide resin with a fibrous reinforcing agent such as glass fibers and carbon fibers or other fillers.

However, although the blend of such general inorganic fillers, particularly, fibrous reinforcing agents such as glass fibers and carbon fibers to polyarylene sulfide resin remarkably improves the mechanical strength of the resin, such addition also causes a significant drawback such as reducing flow properties and extremely deteriorating the smoothness at the surface of the molded products thereby making the surface luster poor. In view of the above, it has been keenly demanded that reinforcement for polyarylene sulfide resin compositions excel in enhancing the moldability and the mechanical strength of the polyarylene sulfide resin and be capable of providing molded products having excellent surface smoothness, surface luster and the like. However, reinforcements capable of satisfying these objects have not yet been found.

SUMMARY OF THE INVENTION

In view of the foregoing problems, it is an object of the present invention to provide a reinforced polyarylene sulfide resin composition having excellent moldability, excellent mechanical properties and heat resistance, as well as having a smooth surface and excellent luster when the composition is prepared as a molded product.

The present inventors have found that the poor surface properties of prior molded products based on fiber-reinforced compositions comprising a polyarylene sulfide resin as the main ingredient and glass fibers or carbon fibers as the reinforcement is attributable to the fibrous material used as the reinforcing agent. The inventors have made an extensive search and study of fibrous materials which cause no such surface roughening and still have a reinforcing effect and, as a result, have accomplished the present invention based on the finding that specific mineral fibers or ceramic fibers shown below are extremely effective.

Accordingly, the present invention concerns a reinforced polyarylene sulfide resin composition comprising (A) 100 parts by weight of a polyarylene sulfide resin and (B) 1 to 200 parts by weight of mineral fibers and/or ceramic fibers having a chemical composition comprising 35 to 50 wt % of $SiO_2$, 8 to 20 wt % of $Al_2O_3$, 10 to 40 wt % of CaO and 3 to 20 wt % of MgO, represented as oxide and a molded product having good surface properties prepared by molding the same.

DETAILED DESCRIPTION OF THE INVENTION

The polyarylene sulfide resin useful as the ingredient (A) in the composition according to the present invention mainly comprises the repeating unit -(Ar-S-)- (in which Ar is an arylene group). As the arylene group (-Ar-) there can be used, for example, p-phenylene group, m-phenylene group, o-phenylene group, substituted phenylene group (in which the substituent is an alkyl group, preferably $C_1$-$C_5$ alkyl group or a phenylene group), p,p'diphenylene sulfone group, p,p'biphenylene group, p,p'diphenylene ether group, p,p'diphenylene carbonyl group and naphthalene group.

In this invention, among arylene sulfide groups constituted with the arylene groups as described above, a polymer using identical repeating units, that is, a homopolymer may be used. Further, to affect the processability for the composition, a copolymer containing different kinds of repeating units may be preferred.

As the homopolymer, a substantially linear homopolymer containing, as the repeating unit, p-phenylene sulfide groups using the p-phenylene group as the arylene group is particularly preferred.

As the copolymer, a combination of two or more of different arylene sulfide groups comprising the arylene group as described above can be used, in particular, a combination mainly composed of p-phenylene sulfide group and containing m-phenylene sulfide group, is particularly preferred. Among the copolymers, a substantially linear copolymer containing more than 60 mol %, preferably, more than 70 mol % of p-phenylene sulfide groups is appropriate in view of the physical properties which are obtained such as heat resistance, moldability and mechanical properties. A copolymer containing the repeating units of the components not at random but in a block-form (for example, as described in Japanese Patent Laid-Open 14228/1986) has good processability and excellent heat resistance and mechanical properties and is preferred.

For the polyarylene sulfide resin used as the ingredient (A) in the composition of the present invention, a polymer obtained from a relatively low molecular weight linear polymer having increased melt viscosity by oxidizing crosslinking or thermal crosslinking and thereby improving the moldability thereof can be used. However, a substantially linear high molecular weight polymer obtained from difunctional monomers by polycondensation can also be used. In most cases, the latter substantially linear polymer provides better physical properties in the resultant product and is preferred.

Further, as the polyarylene sulfide resin according to the present invention, it is also possible and suitable to use a crosslinked polyarylene sulfide resin polymerized by using, in admixture, those monomers having three or more functional groups as the portion of the monomer, or a resin prepared by blending the same with the linear polymer described above.

The reinforcing agent used as the ingredient (B) in the present invention is a mineral fiber and/or ceramic fiber having a specified chemical composition, comprising, as oxides 35 to 50 wt % of $SiO_2$, 8 to 20 wt % of $Al_2O_3$, 10 to 40 wt % of CaO and 3 to 20 wt % of MgO. Further, the reinforcing agent may contain less than 10 wt % of FeO or ingredients such as $TiO_2$, MnO, $Na_2O$ and $K_2O$, each present in amounts of less than 3 wt %. In accordance with the present invention, the objects as above stated are met by a molding composition having a sufficient reinforcing effect on the mechanical properties of a product molded therefrom and, in addition, providing remarkably improved surface properties of the molded product as compared with the properties of a molded product comprising fibrous reinforcing agents such as glass fibers and carbon fibers used generally, by blending the mineral fibers and/or ceramic fibers comprising the chemical composition described above.

If the content of the ingredients as the reinforcing agent are out of the range as defined in the present invention, it is not preferred since at least one of the mechanical properties and the surface properties of the molded product is decreased. For instance, if the $SiO_2$ content exceeds 50% by weight, the properties approach that of usual glass fibers and worsen the surface properties when the polyarylene sulfide composition is prepared into a molded product. On the other hand, if the $SiO_2$ content is less than 35% by weight, this tends to reduce the reinforcing effect of the mechanical properties. Further, for $Al_2O_3$, CaO and MgO, if the content is excessive or insufficient, the effect of reinforcing the mechanical properties is reduced, or the effect on the surface properties of the molded product is not sufficient, and the processability, moldability, heat resistance and the like upon preparation may not be preferred.

Further, in the present invention, the mineral fibers or ceramic fibers as the ingredient (B) preferably have an average fiber diameter within a range of 2 to 10μ and an average fiber length within a range of 50 to 800 μm and, particularly, an average diameter of 4 to 8 μm and an average fiber length of 150 to 800 μm. Those fibers with smaller fiber diameter are difficult to prepare, whereas those fibers of excessively large diameter reduce the effect for reinforcing the mechanical properties. Further, if the fiber length is insufficient, the reinforcing effect is also reduced. On the other hand, if the fiber length is excessive, this hinders the flow properties of the composition and such composition is not preferred in view of the moldability thereof. In addition, the surface properties of the molded product is not sufficient in either instance.

The fibrous reinforcing agent used as the ingredient (B) in the present invention is prepared as fibers containing the above-mentioned chemical ingredients by melting and purifying specific natural rocks, for example, igneous rocks such as basalt, or blast furnace slags by-produced upon iron making, spinning and forming into fibers of a desired diameter. The formed fibers are then chopped or cut by an appropriate chopper or cutter and may be used while partially containing powdery material. If required, the fibers may be classified after cutting to selectively use those with an appropriate fiber length. The mineral fibers or ceramic fibers as ingredient (B) are available from marketed products, for example, "LAPINUS ROCKFIL" trade name of products manufactured by ROCKWOOL LAPINUS B. V., OR "S-FIBERS-FF" trade name of products manufactured by Shin Nippon Seitetsu Co. Ltd.

The reinforcing agent as the ingredient (B) used in the present invention may be used as is, or after having applied thereto a surface treatment or gathering treatment by using a known surface treating agent, for example, an organosilane compound, an organoborane compound, an epoxy compound or an organo-titanate compound and a coupling agent such as an isocyanate compound. The surface treating agents may be added simultaneously with the preparation of the composition. In particular, surface treatment with, or addition of an amino alkoxy silane, epoxy alkoxy silane, vinyl alkoxy silane or mercapto alkoxy silane is beneficial to the mechanical properties.

Further, for the reinforcing agent of the ingredient (B), those prepared by gathering using other appropriate organic materials for preventing fluffing and scattering upon preparation of the composition may also be used.

In the present invention, the content of the ingredient (B) is from 1 to 200 parts by weight, preferably 5 to 150 parts by weight based on 100 parts by weight of the polyarylene sulfide resin. If the blending amount of the ingredient (B) is insufficient, the effect for reinforcing the mechanical properties is not sufficient. On the other hand, if the amount is excessive, the moldability is reduced and the surface properties of the molded product are also adversely effected thereby making it difficult to attain the objects of the present invention. Further, in the composition according to the present invention, use of a fibrous reinforcing agent other than the ingredient (B) is not hindered so long as the addition of the other fibrous reinforcing agents does not particularly hinder the objects of the present invention. For instance, it is possible to use a small amount of organic polymer fibers having a high melting point such as fluoro resin fibers, aromatic polyamide fibers and potassium titanate fibers together. However, since the combined use of glass fibers or carbon fibers as the reinforcing agent for polyarylene sulfide resin has a remarkably adverse effect on the surface properties of a molded product therefrom as described above and, thus, results in difficulty in attaining the objects of the present invention, it is desirable not to use glass or carbon fibers and, if used, such use should be restricted to an extremely small content, for instance, to less than 1/5 of the mineral fibers or ceramic fibers as the ingredient (B).

Further, in the composition according to the present invention, a powdered and granulated filler (including hollow) or a plate-like filler can be blended as the ingredient (C) together with the ingredient (B), although such further ingredient is not essential. Filler (C) is preferably used together with the ingredient (B) for the purpose of eliminating the anisotropy during shrinkage and for suppressing warpage deformation during molding so as to improve the dimensional accuracy or improve the electric properties and heat resistance of the molded product. Any powdery, granular, spherical, hollow and plate-like fillers may be used together with the ingredient (B), and it is possible to use two or more kinds of such fillers depending on the purpose of the molded product.

The combined use of the filler (C) does not hinder surface properties of the molded product and such filler (C) may be effective for providing a good balance among the physical properties as described above.

As examples of the ingredient (C), there can be mentioned as the powdery and granular filler, silicates such as molten silica, quartz powder, glass beads, glass powder, calcium silicate, aluminum silicate, kaolinite, talc, clay, diatomaceous earth and wollastonite, metal oxides such as iron oxide, titanium oxide and alumina, metal carbonates such as calcium carbonate and magnesium carbonate, metal sulfates such as calcium sulfate and barium sulfate, as well as silicon carbide, silicon nitride, boron nitride and a powdery and granular particle of $SiO_2$-$Al_2O_3$ compound identical with or different from the ingredient (B).

As the plate-like filler, there can be mentioned, for example, mica, glass flake and talc. Further as the hollow filler, there can be mentioned, for example, siras balloon, metal balloon, glass balloon, $SiO1_2$-$Al_2O_3$ series hollow particles.

The average particle size of the filler (c) is less than 20 $\mu$m, preferably less than 10 $\mu$m for the general powdery and granular particles, less than 50 $\mu$m, preferably less than 40 $\mu$m for the spherical or flat-type material. If the above-mentioned limit of the filler (C) is exceeded, the surface properties of the molded product tend to be reduced, depending on the shape of the filler.

Further, the blending amount of the filler (C) is less than 150 parts by weight, preferably less than 130 parts by weight based on 100 parts by weight of the polyarylene sulfide resin. Further, the sum of ingredient (C) and the ingredient (B) should be less than 250 parts by weight, preferably less than 200 parts by weight based on 100 parts by weight of the polyarylene sulfide. If the amount ingredient (C) or the sum of the ingredient (B) and the ingredient (C) is excessive, this results in problems with respect to the moldability of the composition and is not preferred. Also the surface properties of the molded product may be affected. The filler (C) may also be used as is, but may, alternatively, be used after having applied thereto a surface treatment such as a coupling agent or being gathered by another organic compound in the same manner as for the ingredient (B).

In the composition according to the present invention, other thermoplastic resins can be added in a small amount within a range not departing from the objects of the invention and such resins include, for example, vinyl resins such as polyvinyl chloride resin and polyvinylidene chloride resin, polycarbonate resin, polyamide resin, polyimide resin, polyolefin resin, polyester resin, natural rubber and synthetic rubber. Further, additives such as a flame retardant, antioxidant, UV-ray inhibitor, lubricant, releasing agent, nucleating agent, foaming agent, cross-linker and colorant may be added as required.

The composition according to the present invention can be prepared by various known preparation methods such as by melting and kneading. For instance, it is a general procedure to previously mix required ingredients uniformly by a mixer such as a tumbler and Henschel mixer, supply the mixture to a one-shaft or two-shaft extruder and pelletize by melt kneading and then direct the same to molding. Upon pelletization, the ingredient (B) and, if required, the ingredient (C) may be added to the ingredient (A) once melted in the extruder, and this method is effective for preventing the flexing of the fibrous material. Further, it is possible to mix the required ingredients, directly supply the mixture to a molding machine and mold them as they are after melt kneading.

As shown in the foregoing descriptions, since the composition according to the present invention has excellent moldability, heat resistance and mechanical properties, and has extremely improved surface properties such as smoothness and luster, particularly when prepared into a molded product, as compared with compositions blended with known glass fibers or known carbon fibers as the fibrous reinforcing agent for a polyarylene sulfide resin, the composition can be used suitably as the material of construction for various kinds of equipment requiring such satisfactory appearance and properties, for example, parts of equipment directed to optical reflection, etc.

Further, the composition of this invention is also effective for attaining a smooth surface when coating a thin film on the surface of the molded products obtained therefrom such as coating, sputtering, plating, vacuum evaporation coating and ion plating.

EXAMPLES

The present invention will now be described more specifically by referring to examples presently below. The invention is not to be construed as being restricted only to such examples.

EXAMPLES 1-12, COMPARATIVE EXAMPLES 1-9

Pellets of polyarylene sulfide resin composition were prepared by adding a reinforcing agent (B) of the present invention and (B,) for comparison whose chemical compositions are as shown in Table 1 and, optionally, a powdery and granular filler or a plate-like filler (C) to a polyphenylene sulfide resin (PPS). The formulations are shown in Tables 2 and 3. The compositions were well mixed in a blender, melt kneaded in an extruder at a cylinder temperature of 310° C. and then, test pieces were molded by an injection molding machine at a cylinder temperature of 320° C. and a die temperature of 150° C. Physical values (tensile strength and elongation, bending property) of the compositions were measured.

Further, for measuring the smoothness as the surface of the molded products, a flat plate of 120 mm×120 mm×3 mm was molded by using an injection molding machine at a cylinder temperature of 320° C. and a die temperature of 150° C. The clearness of the reflected light from the molded flat plates was measured by using an image reflecting measuring device (manufactured by Suga Shikenki). In operation, light was directed at an angle of 45° to a specimen molded plate. Reflected light at 45° was allowed to pass through an optical comb of 1.0 mm width. The maximum value M in the bright portion and the minimum value m in the dark portion of the transmission light which passed through the optical comb were measured by a light receiving device, to determine the image clearness (%) in accordance with the following equation.

Light source: tungsten filament,
Light wavelength: 400 to 700 nm $$\text{Image clearness (\%)} = \frac{M - m}{M + m} \times 100$$

A greater value shows that the clearness is high and the specimen plate is smooth. On the other hand, if the value is small, it shows that "blur" or "distortion" is caused and the surface of the specimen plate is coarse.

The results are shown in Tables 2 and 3.

TABLE 1

|  | Chemical composition (wt %) | | | | | Average diameter (μm) | Average length (μm) | Manufacturer (trade name) |
| --- | --- | --- | --- | --- | --- | --- | --- | --- |
|  | $SiO_2$ | $Al_2O_3$ | CaO | MgO | others | | | |
| B-1 | 41 | 14 | 36 | 5 | 4 | 5 | 200 | ROCKWOOL LAPINUS B.V. |
| B-2 | 48 | 10 | 13 | 18 | 11 | 5 | 200 | ("LAPINUS ROCKFIL") |
| B-3 | 41 | 14 | 36 | 5 | 4 | 8 | 750 | |
| B-4 | 45 | 14 | 15 | 13 | 13 | 5 | 500 | |
| B'-5 | 52 | 48 |  | trace |  | 4 | 500 | TOSHIBA MONOFLEX CO. LTD. ("FIBER FLEX") |
| B'-6 (Glass fiber) | 54 | 14 | 22 | 1 | 9 | 13 | 3000 | NIPPON ELECTRIC GLASS CO. LTD. (ESC D3T717) |
| B'-7 (Carbon fiber) | — | — | — | — | (Carbon 100) | 7 | 5000 | TOHO BESLON CO. LTD. |

TABLE 2

|  | Example 1 | Example 2 | Example 3 | Example 4 | Example 5 | Example 6 | Comp. Example 1 | Comp. Example 2 | Comp. Example 3 | Comp. Example 4 |
| --- | --- | --- | --- | --- | --- | --- | --- | --- | --- | --- |
| Composition | | | | | | | | | | |
| (A) | | | | | | | | | | |
| PPS (parts by weight) | 100 | 100 | 100 | 100 | 100 | 100 | 100 | 100 | 100 | 100 |
| (B) | | | | | | | | | | |
| B-1 (parts by weight) | 10 | 70 | 150 | — | — | — | — | — | — | — |
| B-2 (parts by weight) | — | — | — | 70 | — | — | — | — | — | — |
| B-3 (parts by weight) | — | — | — | — | 70 | — | — | — | — | — |
| B-4 (parts by weight) | — | — | — | — | — | 70 | — | — | — | — |
| (B') | | | | | | | | | | |
| B'-5 (parts by weight) | — | — | — | — | — | — | 70 | — | — | — |
| B'-6 (parts by weight) | — | — | — | — | — | — | — | 10 | 70 | — |
| B'-7 (parts by weight) | — | — | — | — | — | — | — | — | — | 70 |
| Physical property | | | | | | | | | | |
| Tensile strength ($kg/cm^2$) | 1092 | 1630 | 1670 | 1640 | 1780 | 1690 | 1620 | 1050 | 1750 | 2050 |
| Tensile elongation (%) | 4.9 | 1.4 | 1.2 | 1.4 | 1.5 | 1.5 | 1.3 | 4.5 | 1.6 | 1.0 |
| Bending strength ($kg/cm^2$) | 1350 | 1980 | 2178 | 1970 | 2150 | 2010 | 1950 | 1380 | 2500 | 2650 |
| Bending modulus of elasticity ($kg/cm^2$) × $10^4$ | 5.90 | 13.2 | 17.6 | 13.1 | 13.4 | 13.2 | 11.5 | 5.34 | 13.0 | 19.0 |
| Image reflecting property (image clearness) (%) | 76.4 | 71.8 | 69.3 | 70.1 | 70.6 | 71.5 | 28.1 | 53.5 | 4.9 | 6.8 |

TABLE 3

|  | Example 7 | Example 8 | Example 9 | Example 10 | Example 11 | Example 12 | Comp. Example 5 | Comp. Example 6 | Comp. Example 7 | Comp. Example 8 | Comp. Example 9 |
| --- | --- | --- | --- | --- | --- | --- | --- | --- | --- | --- | --- |
| Composition | | | | | | | | | | | |
| (A) | | | | | | | | | | | |
| PPS (parts by weight) | 100 | 100 | 100 | 100 | 100 | 100 | 100 | 100 | 100 | 100 | 100 |
| (B) | | | | | | | | | | | |
| B-1 (parts by weight) | 50 | 50 | 50 | 50 | — | 25 | — | — | — | — | — |
| B-4 (parts by weight) | — | — | — | — | 50 | — | — | — | — | — | — |
| (B') | | | | | | | | | | | |
| B'-6 (parts by weight) | — | — | — | — | — | — | 50 | 50 | 50 | 50 | 25 |
| (C) | | | | | | | | | | | |
| Glass beads (18 μm) (parts by weight) | 50 | — | — | — | 50 | 125 | 50 | — | — | — | 125 |
| Mica (13 μm) (parts by weight) | — | 50 | — | — | — | — | — | 50 | — | — | — |
| Calcium carbonate (4 μm) (parts by weight) | — | — | 50 | — | — | — | — | — | 50 | — | — |
| Glass flake (30 μm) (parts | — | — | — | 50 | — | — | — | — | — | 50 | — |

TABLE 3-continued

| | Example 7 | Example 8 | Example 9 | Example 10 | Example 11 | Example 12 | Comp. Example 5 | Comp. Example 6 | Comp. Example 7 | Comp. Example 8 | Comp. Example 9 |
|---|---|---|---|---|---|---|---|---|---|---|---|
| by weight) Physical property | | | | | | | | | | | |
| Tensile strength ($kg/cm^2$) | 1410 | 1520 | 1324 | 1746 | 1470 | 1162 | 1416 | 1529 | 1337 | 1715 | 1262 |
| Tensile elongation (%) | 1.8 | 1.4 | 1.2 | 1.6 | 1.8 | 1.5 | 1.7 | 1.3 | 1.0 | 1.5 | 1.5 |
| Bending strength ($kg/cm^2$) | 2004 | 2046 | 1857 | 2418 | 2040 | 1939 | 1987 | 2075 | 1882 | 2467 | 2119 |
| Bending modulus of elasticity ($kg/cm^2$) × $10^4$ | 12.0 | 18.9 | 18.7 | 16.6 | 12.5 | 11.5 | 12.6 | 18.3 | 18.2 | 16.8 | 13.0 |
| Image reflecting property (image clearness) (%) | 55.4 | 59.3 | 55.5 | 51.1 | 55.2 | 43.6 | 16.7 | 18.8 | 15.2 | 14.3 | 15.9 |

I claim:

1. A reinforced polyarylene sulfide composition comprising (A) 100 parts by weight of a polyarylene sulfide resin and (B) 1 to 200 parts by weight of mineral fibers and/or ceramic fibers having a chemical composition comprising 35 to 50 wt. % of $SiO_2$, 8 to 20 wt % of $Al_2O_3$, 10 to 40 wt % of CaO and 3 to 20 wt % of MgO represented as oxide, said fibers having an average diameter of 2 to 10 μm, and average fiber length of 50 to 800 μm.

2. The reinforced polyarylene sulfide resin composition as claimed in claim 1, wherein the resin composition further comprises (C) 1 to 150 parts by weight of a powered and granulated filler and/or a plate-like filler based on 100 parts by weight of a polyarylene sulfide resin as the ingredient (A).

3. The reinforced polyarylene sulfide resin composition as claimed in claim 1 wherein said mineral fibers (B) comprise FeO in amounts of 0 to less than 10 wt. % and $TiO_2$, MnO, $Na_2O$ and $K_2O$ each present in amounts of 0 to less than 3 wt. %.

4. The reinforced polyarylene sulfide resin composition as claimed in claim 1 wherein said mineral fibers (B) have an average diameter of 4 to 8 microns and an average fiber length of 150 to 800 microns.

5. The reinforced polyarylene sulfide resin composition as claimed in claim 1 wherein said polyarylene sulfide resin (A) comprises polyphenylene sulfide.

6. The composition of claim 5 wherein said polyphenylene sulfide comprises a homopolymer of p-phenylene sulfide units.

7. The composition of claim 5 wherein said polyphenylene sulfide is a copolymer comprises of p-phenylene sulfide units and m-phenylene sulfide units.

8. The composition of claim 2 wherein the combined amount of mineral fibers (B) and said filter (C) is less than 250 parts by weight based on 100 parts by weight of said resin (A).

9. The composition of claim 8 wherein the combined amount of mineral (B) and said filler (C) comprises less than 200 parts by weight based on 100 parts by weight of said resin (A).

10. The composition of claim 1 wherein said mineral fiber (B) is present in amounts of from 5 to 150 parts by weight.

11. A molded product with good surface properties prepared by molding a reinforced polyarylene sulfide resin composition comprising:

100 parts by weight of a polyarylene sulfide resin and (B) 1 to 200 by weight of mineral fibers and/or ceramic fibers having a chemical composition comprising 35 to 50 wt. % of $SiO_2$, 8 to wt. % of $Al_2O_3$, 10 to 40 wt. % of CaO and 3 to 20 wt. % of MgO, represented as oxide, said fibers having an average diameter of 2 to 10 um and an average fiber length of 50 to 800 μm.

12. The molded product of claim 11 wherein the resin composition further comprises (C) 1 to 150 parts by weight of a powdered and granulated filler and/or a plate-like filler based on 100 parts by weight of said polyarylene sulfide resin (A).

13. The molded product of claim 11 wherein said polyarylene sulfide resin (A) comprises polyphenylene sulfide.

14. The molded product of claim 13 wherein said polyphenylene sulfide comprises a homopolymer of p-phenylene sulfide units.

15. The molded product of claim 13 wherein said polyphenylene sulfide is a copolymer comprised of p-phenylene sulfide units and m-phenylene sulfide units.

16. The molded product of claim 12 wherein the combined amount of mineral fibers (B) and said filler (C) is less than 250 parts by weight based on 100 parts by weight of said resin (A).

17. The molded product of claim 16 wherein the combined amount of mineral fibers (B) and said filler (C) comprises less than 200 parts by weight based on 100 parts by weight of said resin (A).

18. The molded product of claim 11 wherein said mineral fiber (B) is present in amounts of from 5 to 150 parts by weight.

* * * * *